May 29, 1923. 1,456,750
F. W. WILLIAMS
STOP FOR THE CONTROLLING LEVERS OF AUTOMOBILES
Filed Aug. 27, 1920
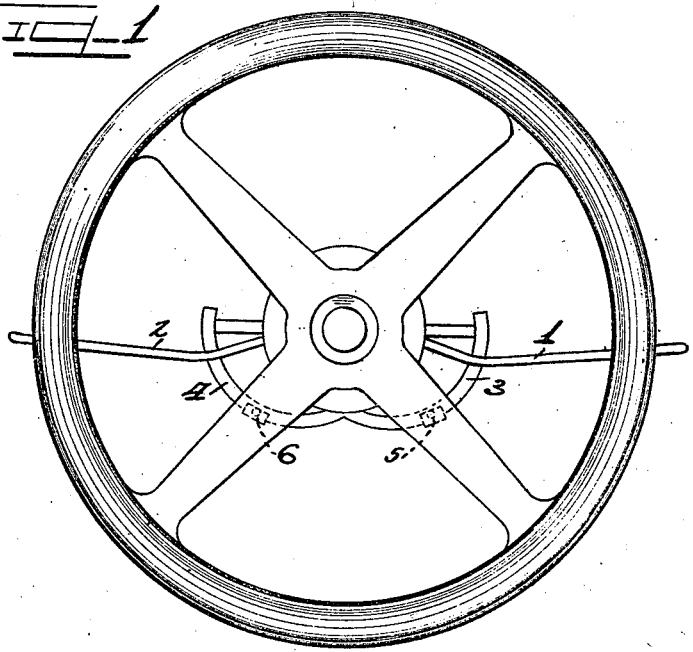
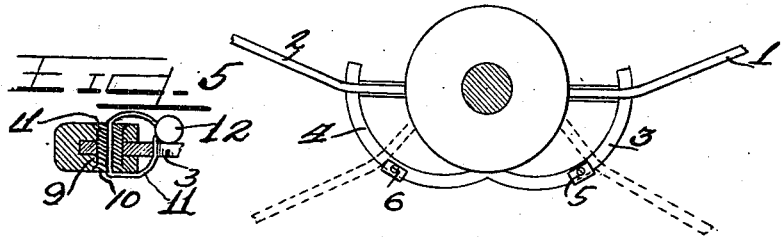
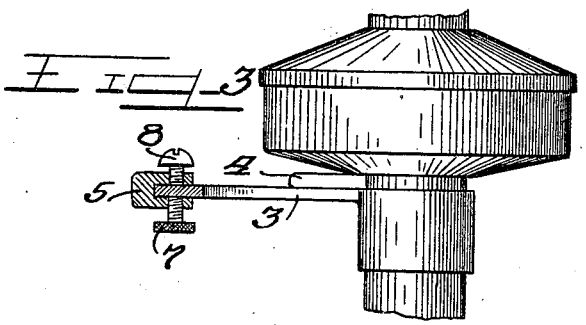
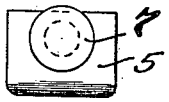
Witnesses
Inventor
Frank W. Williams May 29, 1923.
F. W. WILLIAMS
1,456,750
STOP FOR THE CONTROLLING LEVERS OF AUTOMOBILES
Filed Aug. 27, 1920
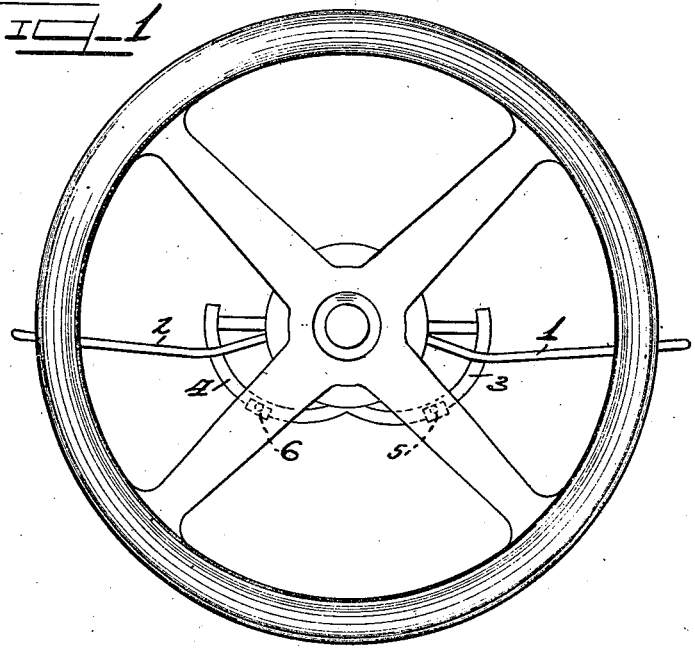
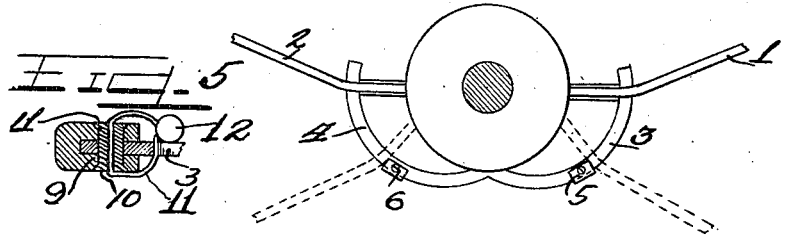
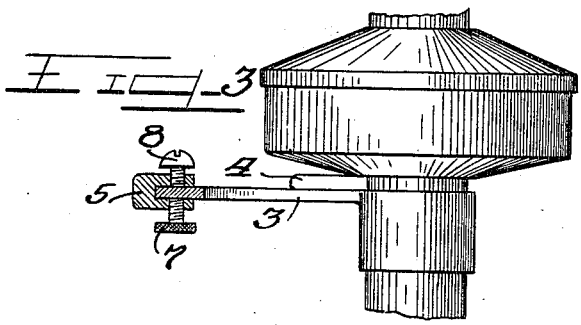
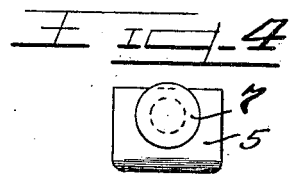
Witnesses
Inventor
Frank W. Williams Patented May 29, 1923.

1,456,750

UNITED STATES PATENT OFFICE.

FRANK W. WILLIAMS, OF CHICAGO, ILLINOIS.

STOP FOR THE CONTROLLING LEVERS OF AUTOMOBILES.

Application filed August 27, 1920. Serial No. 406,433.

*To all whom it may concern:*

Be it known that I, FRANK W. WILLIAMS, a citizen of the United States, and a resident of the city of Chicago, in the county of Cook and State of Illinois, have invented a certain new and useful Stop for the Controlling Levers of Automobiles, of which the following is a specification.

My invention relates to a means for controlling the levers which are used to control an automobile, and provides a stop whereby such levers cannot be moved beyond a predetermined point.

It is an object of my invention to provide a stop which can be readily manufactured and easily applied to the quadrant over which the levers controlling the throttle and the spark of an automobile motor move.

It is a further object of my invention to provide means whereby the correct position for such a stop may be readily determined, and the stop then permanently fixed in such position.

In the accompanying drawings,

Figure 1 is a view of the steering wheel of an automobile showing the levers and the quadrants and with my stops applied to such quadrants.

Figure 2 is a view of a section through the steering post, showing a better view of the levers, quadrants and stops.

Figure 3 is a view showing in section one of the quadrants with the stop applied thereto in a temporary way.

Figure 4 is a view from underneath showing in plan the stop with its temporary fastening.

Figure 5 is a sectional view showing the stop with its permanent fastening.

Referring to the drawings in detail, 1, is the lever controlling the throttle. 2, is the lever controlling the spark. 3, is the quadrant over which the lever 1 passes. 4, is the quadrant over which the lever 2 passes. At 5 and 6 are shown stops applied to these quadrants, so that the levers 1 and 2 cannot pass beyond the dotted line positions indicated in Figure 2. The stop is of a form to embrace the lever quadrant and is provided with two holes into which the screws 7 and 8 are inserted. The screw 7 in the lower hole has a milled head, while the screw 8 in the upper hole is provided with a slot for the reception of a screw driver. The device is applied to the quadrant by placing it thereon, and tightening the screw 7. Since the automobile is not to be driven above a predetermined speed, it is necessary to find the position for the stop corresponding to this speed. For this purpose, the automobile is driven until this speed is reached, screw 7 is loosened, and the stop is moved until it is against the lever in the position corresponding to this speed. The screw 7 is then tightened and the position of the stop is tested by repeatedly driving the automobile at the top speed and seeing whether the lever then contacts with the stop. When the position of the stop is found to be correct, the screw 8 is tightened. This screw is adapted to be used with a tool, and it therefore can be tightened more securely than the screw 7 which has only a milled head.

If desired, the stop may be permanently used in this condition with the screws 7 and 8 therein. Where the device is to be used by a person in authority to prevent the driver of the automobile from exceeding the speed fixed by such person, it is preferable that the stop be permanently secured in the determined position. For this purpose the screws 7 and 8 are removed and a hole is drilled through the quadrant in the position corresponding to the determined position for the stop. This is conveniently done by first removing the screw 7 and inserting through the lower hole the drill which is to pierce the quadrant. When the quadrant is marked by this drill so that the place for the hole therethrough is certainly fixed, the screw 8 is taken out and the stop removed from the quadrant. The ends of the holes in the stop are then countersunk, the stop replaced, and a rivet 9 placed through the holes and through the quadrant. When the rivet is headed up, its metal conforms to the countersunk portions of the hole, so that its surface is flush with that of the stop, making a neat appearance. Preferably a hollow rivet is used and a wire 11 threaded therethrough. A seal 12 is used to secure the ends of this wire. The position of the stop can not then be changed without detection. The same method is used in determining the position of the other stop and in permanently fixing it in its place on the other quadrant.

One advantage of stopping the levers at predetermined points is that the driver cannot through inattention, carelessness or ignorance move either lever beyond this point even when the car is not running. To move the throttle lever too far especially when the clutch is disengaged will cause the engine to race with consequent hard usage of clutch and gears when the clutch is again engaged. To move the spark lever too far, especially at low speeds, is likely to cause wrong firing with consequent shocks to the engine.

It is to be understood that variations in the details of the particular device herein described and variations in the shape of the several parts mentioned may be made without departing from the spirit of my invention, and I do not wish to be limited by the details of this description, or of the drawings, except as is indicated by the following claims.

Having thus described my invention, what I desire to protect by Letters Patent and claim as my invention, is:

1. A lever, a quadrant over which it moves, a U-shaped stop straddling said quadrant, a screw through one leg of said stop bearing against the quadrant, another screw through the other leg of said stop bearing against the other face of said quadrant, one of said screws having a means to facilitate manual turning of the same, and the other screw having means for cooperating with a tool for turning that screw.

2. A bifurcated stop, a threaded hole through each leg of said stop, a screw in each hole, one of said screws provided with means for cooperating with a tool for turning the screw, the other of said screws having means whereby it may be turned without the use of a tool.

In testimony whereof I have hereunto subscribed my name in the presence of two subscribing witnesses.

FRANK W. WILLIAMS.

Witnesses:
 CARLTON HILL,
 FRED E. PAESLER.